United States Patent
Farbaniec et al.

(10) Patent No.: US 6,979,129 B2
(45) Date of Patent: Dec. 27, 2005

(54) SELF-LUBRICATED CONNECTOR

(75) Inventors: Richard Farbaniec, Matawan, NJ (US); Robert J. Taylor, Macomb, MI (US); Albert Lenac, Upr. Montclair, NJ (US); David N. Johnson, Sun Prairie, WI (US)

(73) Assignee: Norton Performance Plastics Corp., Wayne, NJ (US)

( * ) Notice: Subject to any disclaimer, the term of this patent is extended or adjusted under 35 U.S.C. 154(b) by 0 days.

(21) Appl. No.: 10/664,302

(22) Filed: Sep. 16, 2003

(65) Prior Publication Data

US 2004/0057780 A1 Mar. 25, 2004

Related U.S. Application Data

(63) Continuation of application No. 09/261,327, filed on Mar. 3, 1999, now abandoned.

(51) Int. Cl.$^7$ ............................................... F16C 33/04
(52) U.S. Cl. ..................... 384/297; 384/299; 384/907.1
(58) Field of Search ................................. 384/297, 298, 384/299, 300, 907.1

(56) References Cited

U.S. PATENT DOCUMENTS

| | | | |
|---|---|---|---|
| 2,622,949 A | 12/1952 | Cotchett | |
| 2,704,234 A | 3/1955 | Love et al. | |
| 2,805,107 A | 9/1957 | Van De Warker et al. | |
| 2,831,737 A | 4/1958 | Jacoby et al. | |
| 3,018,146 A | 1/1962 | Euwe et al. | |
| 3,926,818 A | 12/1975 | Albertson et al. | |
| 4,058,344 A | 11/1977 | Dyson | |
| 4,076,347 A | 2/1978 | Meek | |
| 4,079,490 A | 3/1978 | McCloskey | |
| 4,258,089 A | 3/1981 | Anderson et al. | |
| 4,575,429 A | 3/1986 | Jacobson | |
| 4,578,317 A | 3/1986 | Nakamura | |
| 4,615,171 A * | 10/1986 | Burk | 384/300 |
| 4,615,854 A | 10/1986 | Pratt et al. | |
| 4,655,944 A | 4/1987 | Mori | |
| 4,674,164 A | 6/1987 | McCloskey | |
| 4,685,184 A | 8/1987 | Satkamp | |
| 4,732,818 A | 3/1988 | Pratt et al. | |
| 5,153,253 A | 10/1992 | Moisey et al. | |
| 5,156,533 A | 10/1992 | Hoffman et al. | |
| 5,207,513 A | 5/1993 | Kondo et al. | |
| 5,236,784 A * | 8/1993 | Kobayashi et al. | 428/408 |
| 5,398,294 A | 3/1995 | Narkon | |
| 5,416,154 A | 5/1995 | Ferdani | |
| 5,435,540 A | 7/1995 | Martin et al. | |
| 5,435,650 A | 7/1995 | Emig et al. | |
| 5,540,420 A | 7/1996 | Luzsicza | |

(Continued)

FOREIGN PATENT DOCUMENTS

CA 596265 4/1960

(Continued)

*Primary Examiner*—Lenard A. Footland
(74) *Attorney, Agent, or Firm*—Sampson & Associates, P.C.

(57) ABSTRACT

A self-lubricating connector or roller is formed by molding a laminated bearing insert in-situ within a nylon support or member. The connector provides a one-piece, self-lubricating device to replace conventional multiple-piece bearing assemblies which typically include a nylon member having an integral metallic sleeve rotatably engaged with a conventional needle or journal bearing. An alternate embodiment of the present invention includes a connector fabricated by press-fitting the laminated bearing insert into a member fabricated from a metallic material. The connectors or rollers of the present invention have several advantages over the prior art, including improved concentricity between the load bearing layer and roller, closer tolerances and elimination of parts and assembly steps.

17 Claims, 2 Drawing Sheets

U.S. PATENT DOCUMENTS

| | | |
|---|---|---|
| 5,568,983 A | 10/1996 | Wilson |
| 5,573,846 A | 11/1996 | Harig et al. |
| 5,671,653 A | 9/1997 | Martensen et al. |
| 5,688,054 A | 11/1997 | Rabe |
| 5,697,709 A | 12/1997 | Mori et al. |
| 5,728,004 A | 3/1998 | Dziegielewski |
| 5,798,155 A | 8/1998 | Yanagawa et al. |
| 5,806,985 A | 9/1998 | Emig |
| 5,860,780 A | 1/1999 | Lenac et al. |

FOREIGN PATENT DOCUMENTS

| | | |
|---|---|---|
| GB | 792980 | 4/1958 |
| GB | 1 383 157 | 2/1975 |
| JP | 179422 A | 11/1982 |
| WO | WO 98/32984 A | 7/1998 |

* cited by examiner

SELF-LUBRICATED CONNECTOR

RELATED APPLICATIONS

This application is a continuation of U.S. patent application Ser. No. 09/261,327 now abandoned entitled SELF-LUBRICATED CONNECTOR which was filed on Mar. 3, 1999.

BACKGROUND OF THE INVENTION

1. Field of the Invention

This invention relates to connectors such as bearings, and more particularly to a maintenance free connector having a roller with an integral lubricious wear layer/metallic substrate combination.

2. Background Information

Throughout this application, various publications, patents and published patent applications are referred to by an identifying citation. The disclosures of the publications, patents and published patent applications referenced in this application are hereby incorporated by reference into the present disclosure.

Maintenance-free sliding bearings comprising a metal substrate and a plastic bearing layer are known. Such bearings provide convenient means for rotatably, pivotably or slidably fastening multiple members to one another in a maintenance free manner. Applications for such bearings include those that utilize continuous rotational movement such as journals for supporting a driven shaft. These bearings are also suitable for applications that employ repeated pivotal movement such as automotive door hinges, door checks, brake and accelerator pedals. Additional applications include those that utilize repeated reciprocal movement such as shock absorbers for automobiles, motorcycles and bicycles, and automotive struts. These bearings may also be used in lighter duty applications such as multiple bar linkages commonly utilized in the automotive industry for trunk deck lid and hood hinges. Such maintenance free bearings may comprise a variety of configurations, such as, for example, bushes or journal bearings, thrust bearings or washers, locating pads, valve port plates, and wearing members for a variety of mechanisms.

An example of such a bearing is sold under the "Norglide®" designation, available from Norton Performance Plastics Corporation, of Wayne N.J. Norglide comprises a thin sheet of bearing material, such as, for example, a PTFE (polytetrafluoroethylene) compound, bonded onto a metallic backing using high temperature thermoplastic films, (e.g. PFA and ETFE) heat and pressure, as described in U.S. Pat. No. 5,573,846 entitled "Polyfluorocarbon Coated Metal Bearing" which is hereby incorporated by reference herein.

One variety of Norglide® materials available from Norton is known as the "Norglide® M" bearings. Norglide M bearings are substantially similar to Norglide materials as discussed above, but they utilize a bearing layer having an open-mesh metal fabric reinforcement disposed therein.

Additional examples of bearings of this general type are disclosed in commonly assigned U.S. Pat. No. 5,860,780, entitled "Self-Lubricated Thrust Rivet"; and U.S. patent application Ser. No. 08/899,572, entitled "Self-Lubricated Bearing" which are both incorporated by reference herein.

Other self-lubricated bearings include a "DU" bearing available from The Glacier Metal Company Limited, Argule House, Joel Street, Northwood Hills, Middlesex HA6 1LN, England. The DU bearing consists of a composite material in which a porous bronze layer is bonded to a metal backing. The porous bronze layer is impregnated with a polymer such as PTFE with a top layer or lining of polymer disposed thereon.

As mentioned above, these bearings are fabricated by applying the lubricious bearing layer to a substantially flat (planar) substrate and subsequently forming the laminate into desired geometries, such as cylindrical bushes, rivets, etc. The thickness of the substrate sheets may be varied, depending on the structural requirements of the particular application. However, increasing the substrate thickness tends to increase the difficulty of forming the resulting laminate, to increase the minimum radius to which the laminate may be formed. For this reason, most self-lubricated bearings discussed hereinabove utilize relatively thin substrates, i.e. having a thickness on the order of about 0.2–2 mm.

For heavier duty applications, in which the increased structural characteristics of a thicker substrate is desired, conventional bearing fabrication techniques have included individually forming the substrate and/or self-lubricating layers as discrete members, followed by assembly of the two discrete parts to one another. For example, U.S. Pat. No. 5,236,784, entitled "Bearing Material and Plastic Bearing" discloses pre-forming a tubular metallic cylinder in a conventional manner, and subsequently molding a plastic bearing material to an inner surface of the cylinder to form a completed bearing member. Conversely, U.S. Pat. No. 5,806,985, entitled "Rod Guide and Method For Its Manufacture" discloses fabricating a tubular bush from PTFE and separately fabricating a discrete metallic carrier having an inner cylindrical surface with a greater diameter than the outer diameter of the bush. The bush is subsequently assembled concentrically with the carrier and secured in place with a die-casting material such as zinc.

Although these approaches of forming (shaping) one or more of the members prior to assembly approaches may operate satisfactorily in some applications, they are not without disadvantages. For example, it is generally more difficult to form an adequate bond between the plastic layer and the substrate than in many of the aforementioned laminated bearings due to the difficulty of applying as much heat and pressure to cylindrical layers as may be applied to planar laminates. Thus, these discretely formed bearings may experience reduced life and/or be more expensive to manufacture than the sheet laminated bearings.

Thus, a need exists for an improved maintenance free bearing that addresses the problems of the prior art.

SUMMARY OF THE INVENTION

According to a first aspect of the present invention, a self-lubricating connector selected from the group consisting of bearings, bushings, rollers and gears includes a tubular insert having an outer substrate and an inner load bearing layer bonded thereto with an adhesive film. The insert is formed by the process of applying the load bearing layer with the adhesive film to a substantially planar surface of the substrate, applying heat and pressure thereto to make a laminate, and forming the laminate into a tube. A member is then integrally engaged with the outer substrate.

In another aspect of the present invention, a method of fabricating a self-lubricating connector includes the steps of:

(a) providing a substantially planar substrate;

(b) fastening a load bearing layer of lubricious material onto said substrate with adhesive film;

(c) applying heat and pressure to said load bearing layer to cause said adhesive film to bond said load bearing layer to said substrate;

(d) forming said substantially planar surface of said substrate into a tube having said load bearing layer disposed on an inner surface thereof; and (e) disposing said substrate in surface to surface engagement with an inner tubular surface of a member to form said connector.

DETAILED DESCRIPTION OF THE PREFERRED EMBODIMENTS

Figure 1:
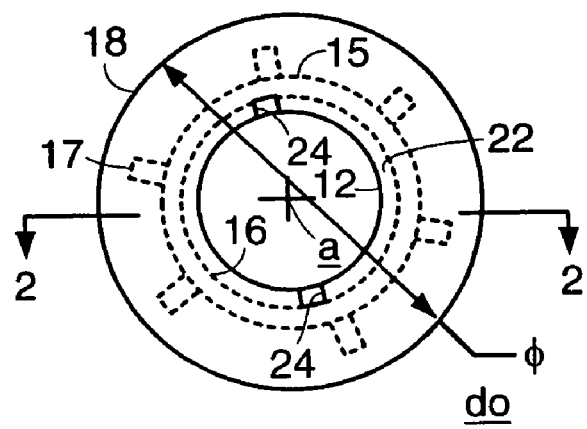
FIG. 1 is a plan view of a self-lubricating connector of the present invention.

As shown in the drawings, the present invention includes a connector 10 which may be fabricated as a bushing or bearing as shown, formed by molding a laminated bearing insert 12 in-situ within a nylon member or roller 14. The connector 10 provides a one-piece, self-lubricating device to replace conventional multiple-piece bearing assemblies which typically include a nylon roller having an integral metallic sleeve rotatably engaged with a conventional needle or journal bearing. An alternate embodiment of the present invention includes a connector 10' fabricated by press-fitting the laminated bearing insert 12 into a roller 14' fabricated from a metallic material. The connectors 10 and 10' of the present invention have several advantages over the prior art, including improved concentricity between bearing material and roller, closer tolerances and elimination of parts and assembly steps.

Throughout this disclosure, the terms "self-lubricated" or "self-lubricating" shall refer to use of a material that exhibits sufficient lubricity to nominally eliminate the need for application of a discrete lubricant to a bearing surface. The term "axial" when used in connection with an element described herein, shall refer to a direction relative to the element, which is substantially parallel to its center of rotation a as shown in the Figures. Similarly, the term "transverse" shall refer to a direction substantially orthogonal to the axial direction. The term "cylindrical" shall refer to any substantially cylindrical shape, including textured or smooth surfaces adapted for rolling engagement with another member, including a surface provided with teeth such as on the peripheral surface of a gear, or provided with treads as on a peripheral surface of a tire or wheel.

Figure 2:
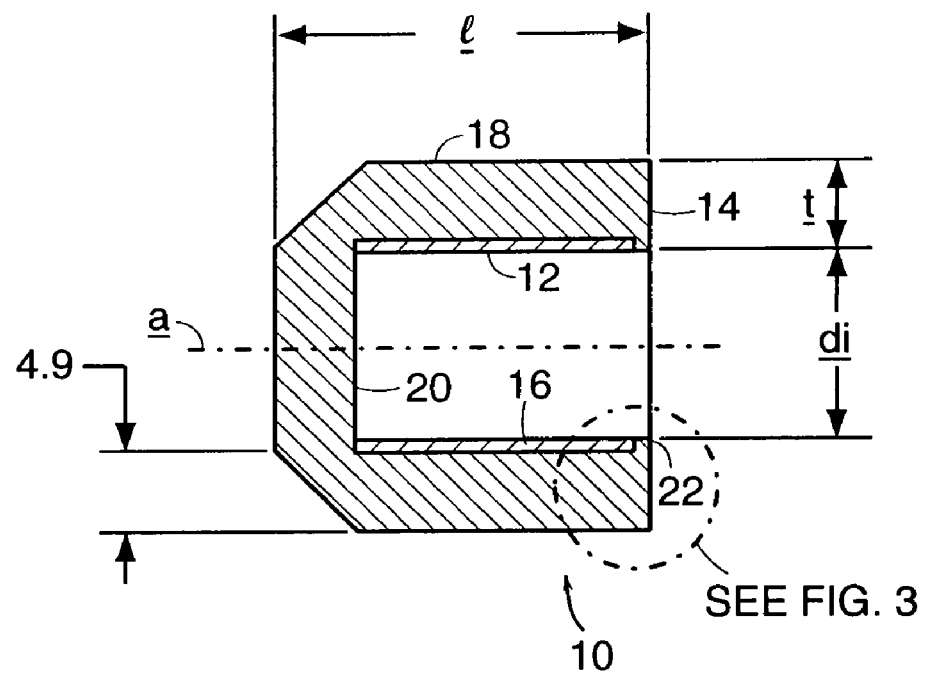
FIG. 2 is a cross-sectional view taken along 2—2 of FIG. 1 with optional portions of the self-lubricating connector of the present invention shown in phantom.
Figure 3:
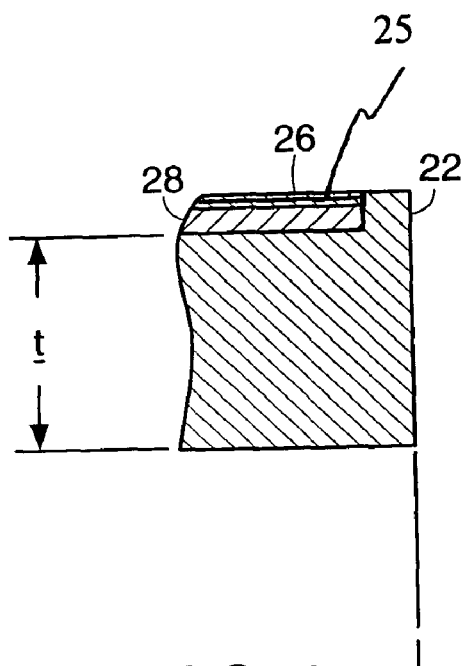
FIG. 3 is a cross-sectional view, on an enlarged scale, of a portion of the connector of FIG. 2.

Referring now to the drawings in detail, connector 10 of the present invention is shown in FIGS. 1–3. As shown in FIGS. 1 and 2, this connector includes a member 14 preferably in the form of a roller having a substantially tubular configuration with concentric cylindrical inner and outer surfaces 16 and 18 having diameters di and do respectively. These diameters define a transverse wall thickness t. While a roller may be preferred for some applications, member 14 may alternatively include a non-circular member having a bore disposed therein of diameter di, without departing from the scope of the present invention.

Both axial ends of the member 14 may be open, or in the alternative, one end may be closed by an end wall 20 as shown in FIG. 2 to provide member 14 with a substantially U-shaped axial cross-section. Such an end wall 20 may be useful in some applications to limit axial movement of the connector 10 relative to an axle or shaft (similar to axle 30 in FIG. 4) rotatably engaged with the connector 10, as will be discussed hereinbelow.

Member 14 may be fabricated from substantially any moldable material having suitable mechanical characteristics for a particular application. For instance, suitable polymeric materials including thermosetting and thermoplastic materials may be utilized. More specific examples include fluoropolymers, acetal, polycarbonate, polyimides, polyetherimide, polyetherketone (PEEK), polyethylene, polypropylene, polysulfones (e.g., polyethersulfone), polyamide (Nylon), polyphenylene sulfide, polyurethane, polyester, polyphenylene oxide, and blends and alloys thereof. In addition, PPS, $PPSO_2$ and the family of aromatic or aliphatic polyketone/ethers, PEI, Nylon 46 and/or Nylon 66 may be utilized.

Bearing insert 12 is disposed in concentric engagement with inner surface 16 of the member 14. The open end of the member is preferably provided with a flange 22 (as best shown in FIG. 3) to limit axial movement of the bearing insert 12 relative to the member. A similar flange may be provided at the closed end, or alternatively, the bearing insert 12 may be directly engaged with end wall 20 as shown. In this manner, bearing insert 12 is effectively captured between flanges 22 and/or an end wall 20 to nominally prevent axial movement of the insert relative to the member 14.

As also shown in FIG. 1, member 14 includes one or more cavities or voids 24 disposed within the flange 22, formed by locating fingers or spacers (not shown) which engage the bearing insert 12 during injection molding of the member, as will be discussed in greater detail hereinbelow.

Turning now to FIG. 3, bearing insert 12 may include a laminated bearing material of the type discussed hereinabove, such as sold under the Norglide® mark. As shown, insert 12 includes a load bearing lubricious layer 26 laminated to a substrate 28. The substrate 28 may be fabricated from various metals, such as steel, aluminum, stainless steel, conventional drawing quality sheet steel, brass or other alloys, or from plastics, ceramics or composites utilizing glass or carbon fibers. It is also contemplated that a steel substrate coated with porous bronze, such as utilized in the aforementioned DU bearing, may be utilized in the fabrication of the bearing insert 12. Moreover, substrate 28 may be provided with structures thereon as disclosed in the above-referenced '572 U.S. Patent Application.

Load bearing layer 26 may comprise any number of suitable lubricious substances, such as a polymer or plastic material, including for example, the compounds disclosed in the above-referenced '846 U.S. Patent. Preferred plastic materials generally include temperature tolerant polymer systems containing high melt temperature organic polymers, and/or systems characterized by a relatively low coefficient of friction. The materials have to be suitable for application or lamination to the material from which the substrate is fabricated. In this regard, fluoropolymers are preferred adhesive films or tie layers 25 for bonding the layer 26 to the substrate 28. For example, by selecting an appropriate adhesive film, nominally any organic polymer may be laminated as the load bearing layer 26 to a metal substrate 28. Suitable adhesive fluoropolymer films are disclosed in the above-referenced U.S. Pat. Nos. 5,573,846 and 5,860,780. Moreover, both the load bearing layer 26 and substrate 28 must be capable of withstanding temperatures typically associated with injection molding the member as discussed herein.

Additional examples of useful polymeric materials in load bearing layer 26 include fluoropolymers (e.g., polytetrafluoroethylene (PTFE), fluorinated ethylene-propylene (FEP), MFA, PCTFE and perfluoroalkoxy polymer (PFA)), acetal, polycarbonate, polyimides, polyetherimide, polyether ketone (PEEK), polyethylene, polypropylene, polysulfones (e.g., polyethersulfone), polyamide (Nylon), polyphenylene sulfide, polyurethane, polyester, polyphenylene oxide, and blends and alloys thereof. In addition, PPS, $PPSO_2$ and the family of aromatic or aliphatic polyketone/ethers, PEI and/or Nylon 46 may be utilized as the continuous matrix. Reactive polymers, such as polyimides, in solid form (unreacted film) or in solution may be utilized. For example, polyimide P84 available from Lending Co., possibly containing PTFE as a filler, may be coated directly onto the substrate 28, the solvent flashed off and the polymer fully imidized. These reactive polymers may thus constitute the continuous matrix. Other polymers such as ultra high molecular weight polyethylene (UHMW PE) (which can then be bonded with lower temperature adhesives such as EVA), or polyamides also may be utilized.

The laminate of layer 26 and substrate 28 is preferably fabricated as a flat sheet, and then subjected to heat and pressure such as by insertion between heated platens of a press, wherein a relatively strong bond is formed between layer 26 and substrate 28. The laminate formed in this manner thus serves as a bearing insert suitable for use in the present invention and may be further formed or shaped into any number of application specific bearing types, such as bushes or journal bearings, thrust washers, and skid plates, etc. For example, skid plates may be formed by utilizing flat portions cut into circles, squares or other polygons. Bushes or journal bearings for use in the embodiments shown in FIGS. 1–4 may be formed by cutting the bearing laminate into strips. Each of these strips, in turn, may be formed into hollow cylinders, with load bearing layer 26 disposed on the inside cylindrical surface thereof to form the bearing insert 12 as shown in FIGS. 1–4. Alternatively, layer 26 may be disposed on the outside surface of the hollow cylinders for other applications. Additional forming steps may be provided if necessary for specific applications. For example, the cylindrical bearing inserts 12 may be flanged (not shown) using techniques familiar to those skilled in the art, such as described in the "Norglide, Norton Performance Plastics" catalogue No. PPL-E-067-1, dated November, 1993, (hereinafter the "Norglide catalogue") which is fully incorporated by reference herein.

Once properly formed, the bearing insert 12 is placed within a mold cavity of a conventional molding apparatus such as an injection molding machine (not shown). The mold cavity is sized and shaped in a known manner to produce a member 14 of desired geometry. In a preferred embodiment as shown, the mold cavity is sized and shaped to produce a member 14 in the form of a roller or other wheel-type device, with the insert maintained in concentric orientation therewith by use of a concentrically disposed locating pin or axle (not shown) engaged with the load bearing layer 26. Spacers or fingers (not shown) are preferably utilized to maintain the bearing insert 12 in axially spaced relation to the downstream wall of the mold, to facilitate formation of flange 22. In the embodiment shown, the member material is injected into the mold cavity proximate the end wall 20 thereof to flow generally axially towards the open end to thus define the downstream direction. One skilled in the art will recognize that the pressure generated by the injected material tends to push the bearing insert 12 axially towards the open end of the cavity. The spacers nominally prevent such movement to maintain the desired spacing required to form flange 22. The bearing insert 12 is thus effectively insert molded (i.e., molded in-situ) with the member 14.

It should be understood however, that the member material may be injected from any direction, with any suitable means utilized for preventing undesired movement of the bearing insert 12, without departing from the spirit and scope of the present invention. For example, member material may be injected from the open end of the member and spacers provided at the closed end thereof.

Advantageously, the present invention provides a self-lubricated connector 10 which has the desirable bond characteristics provided by the aforementioned bearing laminates, while also having the relatively robust structural characteristics provided by the wall thickness t of member 14. In this regard, thickness t may be significantly greater (i.e., an order of magnitude or more) than the thickness of the substrate 28. Moreover, as mentioned hereinbove, the desired bond strength is achieved in part by the pressure to which layer 26 is capable of being applied to the substrate 28 when in its planar configuration, such as by use of a high pressure press. The present invention also provides improved alignment (i.e., concentricity) between the bearing insert 12 and the member 14. This concentricity is achieved due to the precision with which the bearing insert 12 may be coaxially aligned with the mold cavity prior to the molding operation. The present invention thus advantageously may be utilized to replace conventional assemblies which utilize a member engaged with a discrete needle bearing. The present invention further provides reduced componentry cost and labor cost relative to prior art assemblies. For example, in a typical application, the present invention may provide an approximately 25% reduction in member cost relative to the prior art, while also eliminating the prior art labor step of assembling a discrete needle bearing into the member.

Although the member 14 is preferably injection molded from a polymeric material with bearing insert 12 molded in-situ therein, in an alternate embodiment (not shown) member 14 may be fabricated separately, with the insert 12 subsequently assembled thereto. For example, the bearing insert 12 may be assembled into the member 14 after fabrication thereof, and maintained therein using suitable adhesives, etc., or by press-fitting the insert 12 into the member. Such assembly facilitates fabrication of the member 14 from a variety of materials other than the aforementioned injection moldable materials, such as fiber-reinforced composites and/or metallic materials. One skilled in the art will recognize that flange 22 may be eliminated to facilitate such insertion and/or provided after insertion by various techniques such as by swaging the member or by gluing or otherwise fastening a discrete flange to the member.

In another variation of the present invention, a nonmetallic member 14 may be provided with an integrated sleeve 15, shown in phantom in FIG. 1, fabricated by any convenient technique such as molding in-situ therein in the manner described hereinabove. Bearing insert 12 may then be installed in concentric surface-to-surface engagement with the sleeve 15. For example, sleeve 15 may be fabricated from a metallic material, and bearing insert 12 installed by press-fitting therein. Moreover, sleeve 15 may include a textured outer surface, such as, for example, including radially outwardly extending fingers 17, which serve to anchor sleeve 15 within the member 14. Use of this sleeve 15, with or without fingers 17, advantageously enables connector 10 of the present invention to be utilized in relatively heavy-duty applications.

Although a preferred method of fabrication has been described, steps thereof may be modified, eliminated or performed in varying sequence. Application of the load bearing layer may be performed either before or after flanging one or both ends thereof. In this regard, adequate bond strength between the bearing layer 26 and substrate 28 may be achieved by means of an adhesive film and the application of heat and/or pressure to this assembly to laminate it by any convenient means, such as described in U.S. Pat. No. 5,573,846. Additional approaches for improving the bond strength include such techniques as texturing or providing structures to the surface of the substrate as disclosed in the above-referenced '572 patent application, or by interposing a fabric or other mesh between the substrate and layer 26 as utilized in the above-referenced "Norglide® M" bearing material. The less effective prior art bearings described hereinabove lack such a bond between the substrate and load bearing layer.

Figure 4:
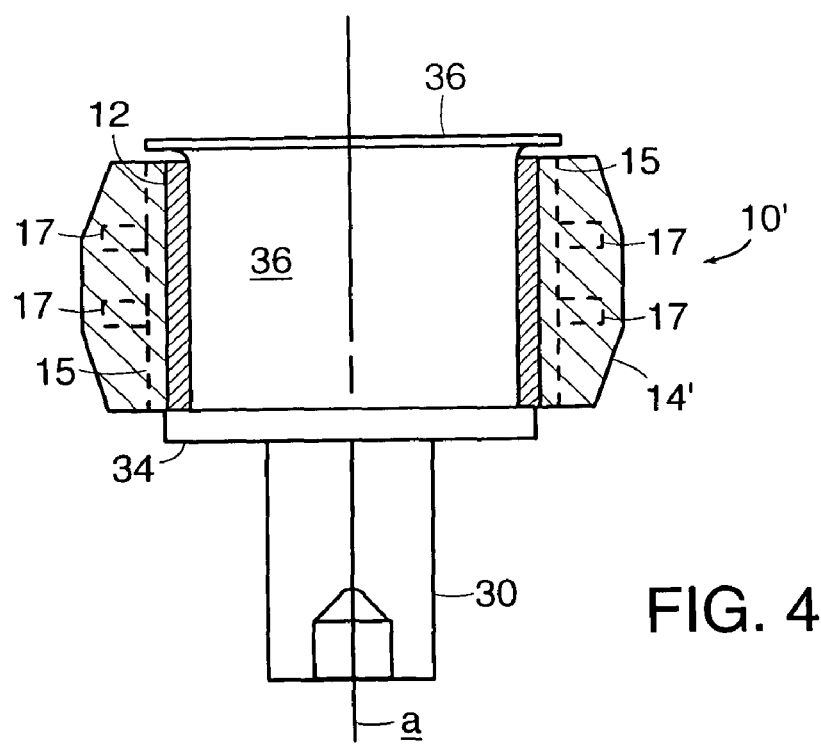
FIG. 4 is an elevational cross-sectional view of an alternate embodiment of a self-lubricating connector of the present invention shown in a typical installation, with optional portions thereof shown in phantom.

Turning now to FIG. 4, an alternate embodiment of the present invention includes a connector 10' shown in a typical roller-type installation. In this embodiment, bearing insert 12 formed as a tube as shown and described hereinabove, is integrally installed in a member 14' which is open at both axial ends thereof. Member 14' may be fabricated from any of the materials described hereinabove, including polymeric or composite materials such as fiber (i.e., carbon fiber or aramid, etc.) reinforced resins or other matrices, nylon/rubber composites such as nylon 66, and metallic materials. In one embodiment, member 14' is fabricated from a metallic material for use in sliding automotive doors and the like. In a variation of this embodiment, member 14' is fabricated from a polymeric material as described hereinabove, with or without sleeve 15 and/or fingers 17 (shown in phantom). The connector 10' is preferably fabricated by press-fitting the bearing insert 12 into the member 14' in the event member 14' is fabricated from a metallic material and/or utilizes a metallic sleeve 15. Alternatively, insert 12 may be molded in-situ or glued in place as described hereinabove with respect to connector 10.

Once assembled, the connector 10' may be installed as shown, on an axle 30 including a cylindrical rivet 32 disposed in surface to surface engagement with the load bearing layer 26 (FIG. 3) of insert 12. In the embodiment shown, roller bearing 10' is captured between a shoulder 34 and flange 36 to nominally prevent disengagement of the bearing 10' from the axle 30 during operation thereof.

In addition to the advantages discussed hereinabove with respect to connector 10, including reduced member cost and simplified, assembly, etc., an embodiment of connector 10' fabricated as a roller bearing provides improved corrosion and wear resistance relative to conventional sealed roller bearings for improved bearing life. For example, cost savings of about 30–50 percent are expected relative to similarly sized conventional sealed roller bearings such as Torrington commercial sealed roller bearings. Performance is also expected to improve by about 10–20 percent, as commonly determined by measuring the clearance or play of the bearing after use. One such test in common use measures the angle at which an axle 30 (FIG. 4) may be moved or wiggled relative to the axis a of the member 14.

Although the present invention has been shown and described herein with a member 14 and 14' having a cylindrical peripheral surface adapted for rolling engagement with another component, the member 14 and/or 14' may be provided with a peripheral surface of substantially any configuration, whether or not adapted for movement relative to the other component, without departing from the spirit and scope of the present invention. An example of such a configuration includes an application in which the peripheral surface of member 14 or 14' is rigidly fastened to the other component, such as to impart translatory movement thereto.

The invention is explained in greater detail by the following examples.

EXAMPLES

Example I

In one example of the present invention, a connector 10 was formed as a bearing substantially as shown and described with respect to FIGS. 1–3, utilizing a tubular insert 12 formed from a strip of "Norglide® M 1.0" laminated bearing material of 1.0 mm thickness (i.e., having a steel substrate 28 of 0.5 mm thickness with a PTFE bearing layer 26 of 0.5 mm thickness including a metallic mesh of 0.25 mm thickness). Prior to forming into the tubular shape, the strip had a length of about 47 mm and a width of about 16 mm. The tubular insert 12 was insert-molded into a member 18 fabricated from Delrin® 100 polymer, and provided with an internal diameter di of approximately 13.7 to 13.8 mm, an external diameter do of approximately 25.4 to 25.6 mm and a length l (FIG. 2) of about 24 mm. This exemplary bearing 10 operated successfully in a tractor seat application, while it also provided an approximately 25 percent reduction in material cost relative to a two-piece prior art device including a similar Delrin member having an integral tubular metallic sleeve assembled to a conventional needle bearing. The one-piece bearing 10 also eliminated the assembly step associated with the two-piece prior art device.

Example II

In another example, connectors 10 are formed substantially as set forth in Example I, utilizing a tubular insert 12 respectively formed from strips of "Norglide® M" and "Norglide® T" having a metallic substrate 28 fabricated from steel or aluminum with a thickness of from 0.2 to 2.0 mm, with a PTFE bearing layer 26 of from 0.25 to 1 mm thickness. The tubular inserts 12 are insert-molded into members 14 fabricated from nylon (polyamide), and provided with an internal diameter di of from approximately 6 to 30 mm and an external diameter do of from approximately 10 to 70 mm. These exemplary bearings are expected to operate successfully, while providing an approximately 20 to 30 percent reduction in material cost relative to similarly sized two-piece prior art devices of the type described in Example I, while also eliminating the assembly step associated with such a two-piece construction.

Example III

In a further example, bearings 10 are formed substantially as set forth in Example II, utilizing tubular inserts 12 which are inserted into members 18 fabricated from a composite or metallic material and secured thereto by adhesive or by sizing the inserts and members to provide an interference fit (i.e., press-fit) with one another. These exemplary bearings are expected to operate successfully, while providing approximately 20 to 30 percent reduction in material cost relative to similarly sized two-piece prior art devices of the type described in Example I.

Example IV

In still further examples of the present invention, connectors 10' were formed substantially as shown and described with respect to FIG. 4, respectively utilizing tubular inserts 12 formed from strips of "Norglide® M 1.0", "Norglide® T 1.0", Norglide® Pro 1.0 and Norglide® SM 1.0 with Exanol, of 1.0 mm thickness (having a steel substrate 28 of 0.5 mm thickness with a PTFE bearing layer 26 of 0.5 mm thickness). The strips were sized and shaped to provide an interference fit with members 14' fabricated from steel and having an internal diameter di within a range of approximately 8.8 to 9.1 mm. The external diameter do of the member 14' was within a range of approximately 15 to 30 mm. These exemplary bearings 10' operated successfully, while providing an approximately 30–50 percent reduction in material cost relative to a similarly sized conventional Torrington sealed member bearing. These bearings 10' also exhibited improved corrosion resistance and an approximately 10–20 percent improvement in wear life relative to such sealed member bearings, as determined by measuring the bearing axial deflection after use.

Example V

In a further example, bearings 10' are formed substantially as set forth in Example IV, utilizing a tubular insert 12 formed from a strip of "Norglide® M" or "Norglide® T" having a metallic substrate 28 fabricated from steel or aluminum with a thickness of 0.2 to 2.0 mm, with a PTFE bearing layer 26 of 0.25 to 1 mm thickness. The tubular inserts 12 are insert-molded into members 14' fabricated from a polymeric material, and provided with an internal diameter di of approximately 10 to 30 mm and an external diameter do of approximately 15 to 50 mm. These exemplary bearings are expected to operate successfully, while providing an approximately 30 to 50 percent reduction in material cost relative to sealed member bearings as described in Example IV, while also providing improved corrosion resistance and a 10 to 20 percent improvement in wear life.

Example VI

In a further example, bearings 10' are formed substantially as described in Example V, with the exception that members 14' are fabricated from a polymeric material with sleeves 15 integrally disposed therein. The tubular inserts 12 are press-fit into the sleeves.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A self-lubricating connector comprising:
   inner, intermediary, and outer cylindrical layers;
   the inner and intermediary layers configured as a tubular laminate of, respectively, a lubricious plastic material bonded to a substrate, wherein the inner layer forms a load bearing layer;
   the substrate having greater tensile strength than the inner layer;
   the outer layer configured as a molded roller member;
   the roller member fabricated from a material selected from the group consisting of thermosetting and thermoplastic resins, and combinations thereof;
   the roller material having a melting point below that of the intermediary layer; and
   the inner and intermediary layers being disposed in in-situ-molded relationship with the molded roller;
   wherein said member is fabricated from a material selected from the group consisting of:
   fluoropolymers, acetal, polycarbonate, polyimides, polyetherimide, polyetherketone (PEEK), polyethylene, polypropylene, polysulfones (e.g., polyethersulfone), polyamide (Nylon), polyphenylene sulfide, polyurethane, polyester, polyphenylene oxide, and blends and alloys thereof.

2. The self-lubricating connector of claim 1, wherein the load bearing layer includes a lubricious plastic material selected from the group consisting of fluoropolymers, polyimide and aromatic ketones, and combinations thereof.

3. The self-lubricating connector of claim 1, wherein the member is formed by injection molding.

4. The self-lubricating connector of claim 1, wherein the member has a substantially cylindrical surface, the tubular laminate is substantially cylindrical, and the substrate is disposed in surface to surface engagement with the substantially cylindrical surface of the member.

5. The self-lubricating connector of claim 4, wherein said cylindrical surface comprises an inner diameter of said member, and said load bearing layer is disposed on an inner surface of said substrate.

6. The self-lubricating connector of claim 5, wherein said member further comprises an outer surface, said outer surface being substantially cylindrical and disposed concentrically with said cylindrical surface.

7. The self-lubricating connector of claim 6, wherein the member comprises a wheel.

8. The self-lubricating connector of claim 1, wherein the tubular laminate further comprises a bonding layer between the load bearing layer and the substantially planar surface of the substrate.

9. The self-lubricating connector as set forth in claim 8, wherein said load bearing layer and said bonding layer are fabricated as a monolayer comprising a polymer blend.

10. The self-lubricating connector of claim 1, wherein the member further comprises a peripheral engagement surface adapted for engagement with another component.

11. The self-lubricating connector of claim 10, wherein said peripheral engagement surface is substantially cylindrical and is adapted for rolling engagement with said other component.

12. A self-lubricating connector comprising:
    inner, intermediary, and outer cylindrical layers;
    the inner and intermediary layers configured as a tubular laminate of, respectively, a lubricious plastic material bonded to a substrate, wherein the inner layer forms a load bearing layer;
    the substrate having greater tensile strength than the inner layer;
    the outer layer configured as a molded roller member;
    the roller member fabricated from a material selected from the group consisting of thermosetting and thermoplastic resins, and combinations thereof;
    the roller material having a melting point below that of the intermediary layer; and
    the inner and intermediary layers being disposed in in-situ-molded relationship with the molded roller;
    wherein the substrate is fabricated from a metallic material.

13. The self-lubricating connector as set forth in claim 12, wherein said substrate is fabricated from aluminum.

14. The self-lubricating connector as set forth in claim 12, wherein said substrate is fabricated from steel.

15. A self-lubricating connector comprising:
inner, intermediary, and outer cylindrical layers;
the inner and intermediary layers configured as a tubular laminate of, respectively, a lubricious plastic material bonded to a substrate, wherein the inner layer forms a load bearing layer;
the substrate having greater tensile strength than the inner layer;
the outer layer configured as a molded roller member;
the roller member fabricated from a material selected from the group consisting of thermosetting and thermoplastic resins, and combinations thereof;
the roller material having a melting point below that of the intermediary layer; and
the inner and intermediary layers being disposed in in-situ-molded relationship with the molded roller;
wherein said load bearing layer further comprises at least one filler selected from the group consisting of carbon, graphite, aluminum oxide, silicon carbide, boron nitride, silicon nitride, glass, bronze, fluoropolymer, silicone, molybdenum disulfide, and combinations thereof.

16. A self-lubricating connector comprising:
inner, intermediary, and outer cylindrical layers;
the inner and intermediary layers configured as a tubular laminate of, respectively, a lubricious plastic material bonded to a substrate, wherein the inner layer forms a load bearing layer;
the substrate having greater tensile strength than the inner layer;
the outer layer configured as a molded roller member;
the roller member fabricated from a material selected from the group consisting of thermosetting and thermoplastic resins, and combinations thereof;
the roller material having a melting point below that of the intermediary layer; and
the inner and intermediary layers being disposed in in-situ-molded relationship with the molded roller;
wherein the tubular laminate further comprises a bonding layer between the load bearing layer and the substantially planar of the substrate;
wherein said load bearing layer and said bonding layer are fabricated as a monolayer comprising a polymer blend; and
wherein said monolayer comprises PFA and PTFE.

17. The self-lubricating connector as set forth in claim 16, wherein said monolayer is alternately produced by melt extrusion if PFA is predominant and by sheet skiving if PTFE is predominant.

* * * * *